(12) United States Patent
Begon et al.

(10) Patent No.: US 7,581,832 B2
(45) Date of Patent: Sep. 1, 2009

(54) POLARIZING OPTICAL ELEMENT COMPRISING A POLARIZING FILM AND METHOD FOR MANUFACTURING SUCH ELEMENT

(75) Inventors: Cédric Begon, Charenton le Pont (FR); Alexandra Roos, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 263 days.

(21) Appl. No.: 11/377,238

(22) Filed: Mar. 16, 2006

(65) Prior Publication Data

US 2007/0195422 A1    Aug. 23, 2007

(30) Foreign Application Priority Data

Feb. 23, 2006  (FR)  .................................. 06 01608

(51) Int. Cl.
    *G02C 7/12* (2006.01)
(52) U.S. Cl. ........................ 351/49; 351/163; 351/177
(58) Field of Classification Search ................. 351/41, 351/44, 49, 163, 166, 177
    See application file for complete search history.

(56) References Cited

U.S. PATENT DOCUMENTS

| | | | |
|---|---|---|---|
| 4,242,162 A | 12/1980 | Ronning et al. | 156/212 |
| 4,388,375 A | 6/1983 | Hopper et al. | |
| 4,826,548 A | 5/1989 | Herbin et al. | 156/152 |
| 6,106,665 A | 8/2000 | Wood et al. | 156/379.6 |
| 6,413,641 B1 | 7/2002 | Yamasaki et al. | |
| 6,716,294 B1 | 4/2004 | Vetrini | 156/102 |
| 2001/0028435 A1 | 10/2001 | Evans et al. | |
| 2001/0038438 A1 | 11/2001 | Beeloo et al. | |
| 2003/0063255 A1 | 4/2003 | Moravec et al. | |
| 2004/0156105 A1* | 8/2004 | Trapani et al. | 359/499 |
| 2005/0121835 A1 | 6/2005 | Herod et al. | 264/492 |
| 2006/0219347 A1* | 10/2006 | Begon et al. | 156/99 |
| 2007/0195262 A1* | 8/2007 | Mosse et al. | 351/159 |

FOREIGN PATENT DOCUMENTS

| | | |
|---|---|---|
| DE | 195 20 328 A1 | 12/1996 |
| EP | 0 146 199 A1 | 6/1985 |
| EP | 0 285 490 A1 | 10/1988 |
| EP | 1 182 655 A1 | 2/2002 |
| EP | 1217397 | 6/2002 |
| GB | 1427845 | 3/1976 |
| WO | WO 97/35216 | 9/1997 |
| WO | WO 99/29494 | 6/1999 |

OTHER PUBLICATIONS

Patent Abstracts of Japan of application 2004 010647, published on Jan. 15, 2004.

* cited by examiner

*Primary Examiner*—Huy K Mai
(74) *Attorney, Agent, or Firm*—Occhiuti Rohlicek & Tsao LLP

(57) ABSTRACT

A polarizing optical element comprises a transparent optical base element and a layered structure that incorporates a polarizing film. The polarizing film is of the dichroic dye type and is oriented uniaxially. The layered structure is bonded to the optical base element by means of a layered structure that includes at least one layer of a pressure-sensitive adhesive. Thanks to the use of pressure-sensitive adhesive, the polarizing film during the bonding operation maintains a high polarization efficiency and an optical quality compatible with many applications of the optical element, especially ophthalmic applications.

34 Claims, 6 Drawing Sheets

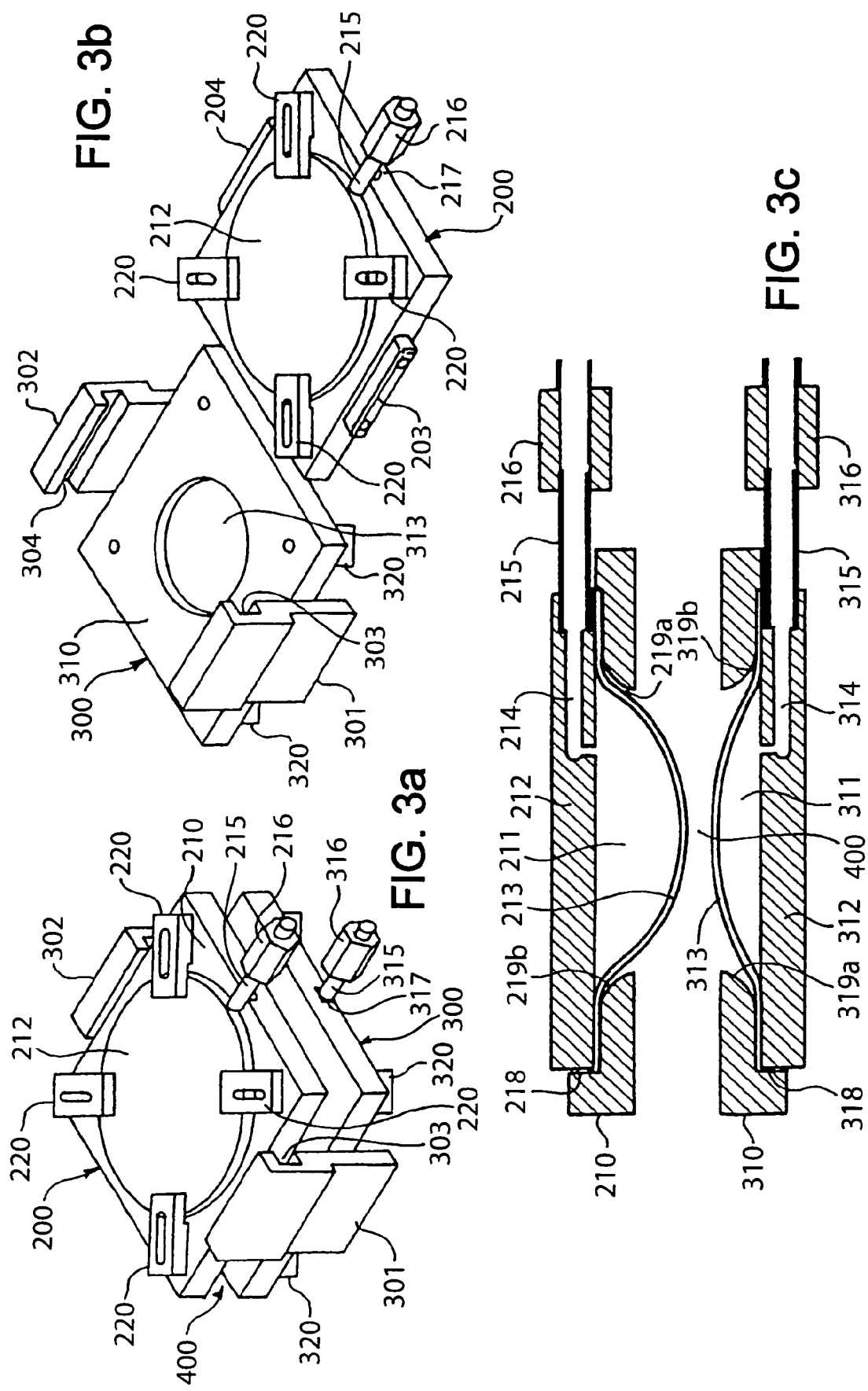

POLARIZING OPTICAL ELEMENT COMPRISING A POLARIZING FILM AND METHOD FOR MANUFACTURING SUCH ELEMENT

FIELD OF THE INVENTION

The present invention relates to a polarizing optical element which comprises a polarizing film based on dichroic dyes. It also relates to a method for manufacturing such a polarizing optical element. In particular, the polarizing optical element may be an ophthalmic lens.

BACKGROUND OF THE INVENTION

It is known to produce a polarizing optical element by combining a polarizing film based on polyvinyl alcohol or PVA with an optical base element. The optical base element is most often an optical lens.

Indeed, polarizing films based on polyvinyl alcohol have been commercially available for a long time and their polarization efficiency is satisfactory. Such polarizing films are conventionally obtained by incorporating dichroic dye molecules and/or dichroic iodine crystals into a polyvinyl-alcohol-based film and then by drawing the film uniaxially so as to orient the dichroic dye molecules and/or the dichroic iodine crystals along the draw direction. The term "dichroic dye" is understood to mean a species that may be of a molecular or crystalline nature and has a preferred absorption of visible electromagnetic radiation for a particular spatial orientation. The polarizing films thus obtained are inexpensive and possess an optical quality compatible with many applications, especially ophthalmic applications. Substrates other than PVA substrates may also be used with this technique of orienting dichroic dyes by uniaxial drawing. For example, polyethylene terephthalate or PET may in particular be mentioned.

A first difficulty in producing an optical element that incorporates a polarizing film lies in how to obtain sufficient and durable cohesion between the optical base element and the polarizing film.

A second difficulty is how to control the position of the polarizing film relative to the faces of the optical element so as not to disturb the path of the light beam through the optical element. This is important for obtaining high uniform optical quality over the entire area for the final polarizing product, insofar as the index of the polarizing film is generally different from the index of the material constituting the optical element. Practically, it is desirable to have excellent parallelism between the face of the optical element that is closest to the polarizing film and the surface of the polarizing film.

To this end, two methods are used for manufacturing an optical element with a polarizing film, depending on the nature of the material of the optical base element.

The first method is used when the optical base element is made of a thermosetting material. The polarizing film, generally preformed to the desired curvature, is placed inside the mold for the optical base element, at a certain distance from two opposed surfaces of the mold. The monomer liquid for the thermosetting material is then poured into the mold on either side of the polarizing film. It is then polymerized by heating the mold containing the liquid and the polarizing film. A polarizing element is obtained, that thus durably incorporates a polarizing film in its thickness. Usually, the polymerization is carried out by heating the mold to a maximum temperature of between 90° C. and 130° C. (degrees Celsius) for a time of about 20 hours. Such polymerization parameters are especially used when the material to be polymerized is diethylene glycol-bis(allyl carbonate), more currently known as CR39. However, such heating may impair the polarizing film in an uncontrolled manner: the tint of the polarizing film may vary and/or the polarization efficiency of the film may be lowered after the process, and/or the dimensional stability of the film may be impaired. Such a dimensional variation, even if slight, and/or a slight deficiency in the gripping of the film may induce strains in the polarizing film that generate polarization nonuniformity over the entire surface of the film. Furthermore, the position of the polarizing film inside the mold may be affected by the method of filling the mold with the monomer liquid on either side of the film so that, after polymerization, the position of the film relative to the front face of the lens may vary uncontrollably from one region of the optical element obtained to another. Such variations may impair the precision that is needed for certain applications, such as the manufacture of an ophthalmic lens. Moreover, it is particularly difficult with this method to ensure that there is parallelism between one face of the mold and the surface of the polarizing film. This proves to be penalizing for the manufacture of polarizing ophthalmic lenses of the progressive type in which the radius of curvature varies continuously on the surface of the optical element.

The second method of manufacturing an optical element with a polarizing film is used when the optical base element is made of a thermoplastic such as, for example, polycarbonate, polyamide or polymethyl methacrylate (PMMA). The polarizing film is placed on the inside of an injection-molding mold, against one face of said mold, and then the heated thermoplastic is injected under pressure. The temperature of the injected material at the moment it is introduced into the mold is high, typically for example between 270° C. and 320° in the case of a polycarbonate material. In order to obtain a polarizing optical element of acceptable quality in this way when the material of the uniaxially drawn polarizing film is based on PVA, it is necessary for the PVA polarizing film to be initially laminated between two protective films, for example two polycarbonate films each 0.4 mm in thickness. The films protecting the PVA provide the mechanical cohesion that allows the PVA polarizing film to withstand the high injection pressure, and they also have a role of thermal protection against the high temperature at which the thermoplastic is injected. This role is better fulfilled the higher the thickness of the protective film. However, it should be noted that during the injection the polarizing film may undergo uncontrolled deformations, while at the same time it may be impaired by the high temperature of the injected material. In addition, it is important that one of these films also ensures good cohesion with the injected material of the optical element, for example by fusing with the latter on their contact surface. Furthermore, the protective film that covers the polarizing film on the opposite side to the optical element made of injected material must not exhibit substantial birefringence since, in this case, the polarizing efficiency of the optical element that is finally obtained may be reduced. This limits the variety of polarizing film that can be used in this type of method.

One object of the present invention therefore consists in proposing an inexpensive polarizing optical element that can be manufactured simply and without a prolonged heating step, and which exhibits good optical quality by controlling the distance separating the polarizing film from the face closest to the optical element, including for the manufacture of progressive ophthalmic lenses.

SUMMARY OF THE INVENTION

To this end, the invention proposes a polarizing optical element comprising:
- an optical base element;
- a layered structure that incorporates at least one polarizing film, this polarizing film containing at least one dichroic dye and being oriented;
- a layered structure that includes at least one layer of a pressure-sensitive material of optical quality, which structure is placed between one surface of the optical base element and the layered structure containing the polarizing film, so as to permanently retain said structure on the surface of the optical base element.

For the purposes of the invention, the expression "optical base element" is understood to mean a colorless or tinted transparent element having a transmission factor (Tv) in the visible light spectrum of between 100% and 8%.

For the purposes of the invention, the expression "layered structure that incorporates at least one polarizing film" is understood to mean either a structure comprising only one polarizing film, for example based on PVA or PET, or a structure comprising a polarizing film having, at least on one of its faces, a protective film. In the rest of the description, said layered structure is also called a polarizing structure.

For the purposes of the invention, the expression "layered structure that includes at least one layer of a pressure-sensitive adhesive" is understood to mean a structure comprising either a single layer of a pressure-sensitive adhesive or a structure comprising several successive layers of pressure-sensitive adhesive, each of said layers being identical or different. In this variant, optionally an insert layer may be present between two layers of pressure-sensitive adhesive. Thus, a layered structure comprising a first layer of a pressure-sensitive adhesive, an insert layer and a second layer of a pressure-sensitive adhesive is fully comprised in the invention. In the rest of the description, said layered structure is also called an adhesive structure.

In a polarizing optical element according to the invention, the polarization function is provided by a film containing oriented dichroic dyes. This polarizing film forms part of a layered structure that may be of a currently available low-cost model. This structure is bonded to the optical base element using a layered structure that includes at least one layer of a pressure-sensitive adhesive. The polarizing film is therefore joined to the optical base element by simply bringing the polarizing film into contact with the surface of the optical element via at least one layer of a pressure-sensitive adhesive, followed by applying pressure. This may be achieved rapidly, and without the use of a complex tool, unlike what would be required for keeping the film at a controlled distance from the surface of the optical element.

The optical base element may be a standard component such as, in particular, an ophthalmic lens, a helmet sight, a sighting or measuring optical element, etc. The bonding of the polarizing layered structure therefore occurs independently of the manufacturing of the optical base element and of its thermosetting or thermoplastic nature. This provides considerable flexibility in providing the polarization function. In particular, the polarizing film may be combined with the optical base element near the location of the retailer, or even according to a particular demand by a customer. As a result, stock management is simplified.

In the case of an ophthalmic lens, the polarizing layered structure is preferably located on the front face of this lens (usually called the front face of the ophthalmic lens), so that the possible birefringence of the optical base element does not reduce the polarization efficiency of the lens when it is used for vision. For the purposes of the invention, the term "ophthalmic lens" is understood to mean a lens that will be in particular fitted to a spectacle frame, for the purpose of protecting the eye and/or for correcting vision, these lenses being chosen from afocal, unifocal, bifocal, trifocal and progressive or varifocal lenses.

According to the invention, the use of a layered structure that includes at least one layer of pressure-sensitive adhesive or PSA is particularly advantageous as it allows the layered structure that includes the polarizing film to be applied to the surface of the optical base element in a simple and inexpensive manner, while still maintaining the refractive properties of the optical element. All PSAs have in common the characteristics of exhibiting tack permanently and a low elastic modulus at room temperature, typically at $10^3$ and $10^7$ Pa (pascals). It should be pointed out that the adhesion mechanism involved with such an adhesive does not involve a chemical bond, but it is based on the particular viscoelastic properties of the PSA material. These properties intrinsic to each PSA formulation make it possible in particular to establish electrostatic van der Waals interactions at the bonding interface. This is what occurs when the PSA is brought into contact with a solid material with application of pressure— the applied pressure and the low modulus of the PSA making it possible to guarantee intimate contact of the PSA on a molecular scale with the topology of the material to be bonded. Moreover, the bulk viscoelastic properties of the PSA make it possible to dissipate, within the thickness of the adhesive layer, the energy resulting from mechanical stressing of the bonding interface, and therefore to withstand the debonding mechanisms.

In addition, the possibility of depositing the PSA adhesive in the form of a thin uniformly thick layer, the thickness of which is between 0.5 and 300 microns, makes it possible, when the optical base element is an optical or ophthalmic lens, not to impair the nominal power whatever the spatial region in question of the optical element. In this way, the bonding of the polarizing film is compatible with the precision that is required when the optical base element is a progressive ophthalmic lens.

The use of a pressure-sensitive adhesive does not require the use of irradiation, for example ultraviolet radiation, nor intensive heating, for obtaining permanent bonding. Thus, the polarizing film is neither impaired nor degraded by such irradiation or heating.

Several pressure-sensitive adhesives may be used to form the pressure-sensitive adhesive layered structure. Advantageous, the pressure-sensitive adhesive used is chosen from a compound based on a polyacrylate, a styrene-based block copolymer and a blend incorporating a natural rubber. More particularly, mention may be made by way of nonlimiting examples of PSAs having general compositions based on polyacrylates, polymethacrylates, based on ethylene copolymers, such as ethylene vinyl acetate, ethylene ethyl acrylate and ethylene ethyl methacrylate copolymers, PSAs based on synthetic rubber and elastomers, including silicones, polyurethanes, styrene-butadienes, polybutadienes, polyisoprenes, polypropylenes, polyisobutylenes, PSAs based on polymers containing nitriles or acrylonitriles, PSAs based on polychloroprene, PSAs based on block copolymers that include polystyrene, polyethylene, polypropylene, polyisoprene, polybutadiene, PSAs based on polyvinylpyrrolidone or vinylpyrrolidone copolymers, and also compositions or blends (with continuous or discontinuous phases) of the above polymers, and also block copolymers obtained from the above. These PSAs may also include, within their formulation, one or more additives chosen in particular from tackifiers, plasticizers, binders, antioxidants, stabilizers, pigments, dyes, dispersing agents and diffusing agents. Within the context of the invention, it will be preferred to use a polyacrylate-based PSA.

Preferably, the adhesive structure has an overall thickness of between 0.5 and 300 microns, preferably between 2 and 100 microns, so as to ensure efficient bonding while still maintaining a uniform thickness.

Preferably, the polarizing film is based on polyvinyl alcohol or PVA, typically with a thickness of between 5 and 200 microns. Alternatively, it may be based on polyethylene terephthalate or PET, typically with a thickness of between 50 and 500 microns. Such polarizing films, which may have a high polarization efficiency, are commercially available.

The optical base element may comprise a portion of a material based on: at least one polycarbonate compound; at least one polyamide compound; diethylene glycol-bis(allyl carbonate) polymers or copolymers; thiourethane polymers or copolymers; or episulfide polymers or copolymers. However, thanks to the use of a pressure-sensitive adhesive layer, the invention may be implemented with optical base elements made of any material, whether mineral, organic or possibly composite. In general, the invention is easily implemented when the optical base element comprises one or more polymers chosen from: polycarbonates; polyamides; polyimides; polysulfones; polyethylene terephthalate and polycarbonate copolymers; polyolefins, especially polynorbornenes; diethylene glycol-bis(allyl carbonate) polymers and copolymers; (meth)acrylic polymers and copolymers, especially (meth) acrylic polymers and copolymers derived from bisphenol A; thio(meth)acrylic polymers and copolymers; urethane and thiourethane polymers and copolymers; epoxy polymers and copolymers; and episulfide polymers and copolymers.

The invention makes it possible in particular to produce a polarizing optical element having a small thickness compared with the thicknesses that can be achieved via the two aforementioned conventional manufacturing methods, namely, on the one hand, the molding of a thermosetting resin on either side of a polarizing film and, on the other hand, the injection of a thermoplastic polymer against a polarizing film on which two protective films have been laminated. The possibility of obtaining a thin polarizing lens is particularly advantageous when the lens is an ametropia-correcting ophthalmic lens insofar as reduction in the thickness of the lens is accompanied by a weight reduction, thereby making it more comfortable for the person wearing the lens for a prolonged time. The invention can therefore be particularly advantageously combined with the use, as optical base element, of an ametropia-correcting lens with a high refractive index, for example at least 1.60.

According to a preferred embodiment of the invention, the polarizing structure further includes at least one protective film for protecting the polarizing film. Such a protective film prevents the polarizing film from being degraded when it is combined with the optical base element, for example degraded by unintentional tearing, by scratching or by diffusion of a foreign substance into the material of the polarizing film. Furthermore, the protective film makes it easier to handle the polarizing structure, by reinforcing and stiffening the latter, compared with the case when a polarizing film is handled alone.

When the polarizing structure includes only a single protective film, this latter is preferably placed on the opposite side of the polarizing film from the optical base element. Indeed, within the polarizing optical element finally obtained, the polarizing film is then sandwiched between the protective film and the optical base element, so that it is protected on both its faces against chemical or mechanical attack or soiling. Furthermore, at least one functional coating may be placed on the protective film. Such a coating may give the optical element additional functions, such as elimination of light reflection, protection against impacts and scratches and/ or protection against soiling. Such coatings may in fact be placed easily on the protective film, given that the latter is made of a chemically inert material. In particular, the protective film may be based on cellulose triacetate (TAC), cellulose acetate butyrate (CAB), polyethylene terephthalate (PET), polycarbonate or polyamide.

The polarizing structure may also include two protective films, which are placed one each side of the polarizing film. This results in better protection of the polarizing film, especially when said layered structure has not been yet applied against the optical base element. Furthermore, such protection prevents chemical components of the layered structure that includes a pressure-sensitive adhesive from interacting with the polarizing film, or vice versa, and from impairing the optical properties of the latter.

The invention also provides a method for manufacturing such a polarizing optical element as described above. In such a method, the polarizing structure is pressed against the surface of the optical base element, with the adhesive structure placed between said polarizing structure and the optical base element. According to this method, the permanent tack of the PSA makes it possible to choose the moment when this function is used to bond the associated layered structure to the polarizing film and to ensure permanent and coherent adhesion to the optical article. Management of the production line is then conceivable owing to this permanent tack property possessed by PSAs, but all the properties thereof are used only after pressure (of a few kilograms per square centimeter) has been applied between the PSA and the layered structure associated with the polarizing film that it is desired to bond.

BRIEF DESCRIPTION OF THE DRAWINGS

FIGS. 3a-3c illustrate a second pressing device that can be used in a method for manufacturing a polarizing optical element according to the invention.

For the sake of clarity in the figures, the dimensions of the elements shown have not been drawn to scale. Furthermore, identical references in different figures denote identical elements, or those having identical functions.

DETAILED DESCRIPTION OF PREFERRED EMBODIMENTS

Figure 1A:
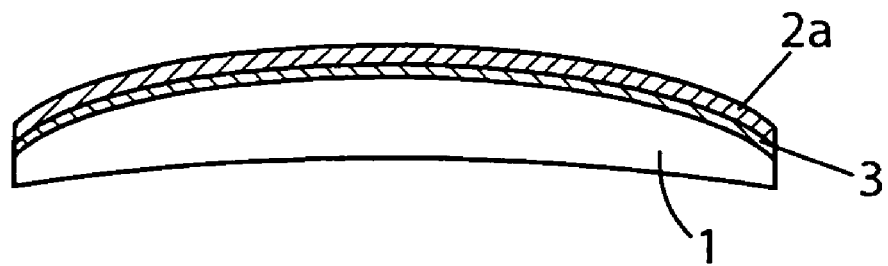
FIGS. 1a-1c are sectional views of three polarizing optical elements according to the invention.

As shown in FIG. 1a, an ophthalmic lens 1 is coated with a polarizing film 2a on its convex face, or front face with reference to the orientation of the lens when it is used by a wearer. The lens 1 may be an ametropia-correcting lens, especially of the progressive or varifocal lens type, made of diethylene glycol-bis(allyl carbonate) polymers or copolymers. Such a material is known commercially by the name CR39 and has a refractive index of about 1.5. The lens 1 constitutes the optical base element.

The polarizing film 2a may consist mainly of polyvinyl alcohol or PVA. It also contains dichroic dyes that may consist of molecules of one or more types, which may have been selected and incorporated into the film in predetermined amounts in order to obtain the required polarization efficiency and color. The film is then drawn along a fixed direction, so as to uniaxially orient the dichroic dye molecules. The polarization effect of the film 2a results from this orientation. The film 2a may have a thickness of between 5 and 200 microns, for example 40 microns.

The polarizing film 2a is bonded to the convex surface of the lens 1 by a layer 3 of a pressure-sensitive adhesive. The layer 3 may be made of polyacrylate and have a thickness of 25 microns for example. This layer, by bonding, keeps the polarizing film 2a permanently on the convex surface of the lens 1.

Figure 1B:
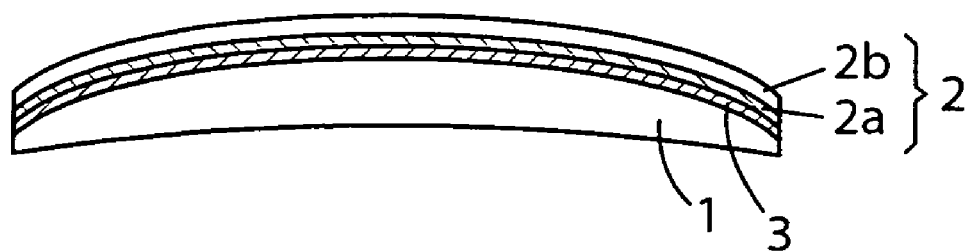

In the polarizing optical element shown in FIG. 1b, the polarizing film 2a is coated with a protective film 2b, on the opposite side of the film 2a from the lens 1. In this way, the polarizing film 2a is protected from any soiling or scratching that might occur during use of the optical element. The protective film 2b may for example be made of cellulose triacetate and have a thickness of about 80 microns. The films 2a and 2b therefore constitute together a polarizing layered structure 2 supported by the lens 1 on its convex face. Optionally, additional coatings (not shown) may be placed on the film 2b, for example on the external face of the latter, so as in addition to give the optical element an impact-resistant function, an antireflection function, an antiabrasion function, an antisoiling function, an antifogging function, an antistatic function or a combination of some of these functions.

Figure 1C:
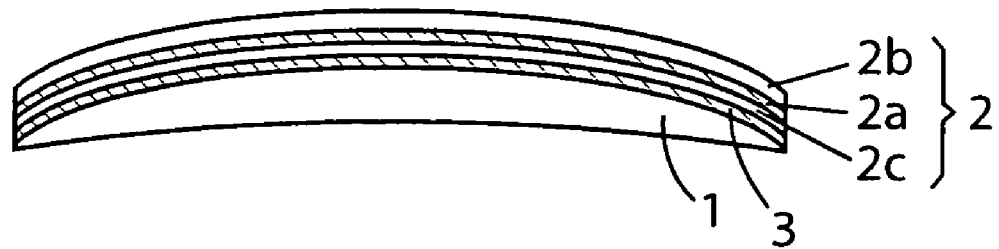

In the polarizing optical element shown in FIG. 1c, the polarizing structure 2 includes, in addition to the polarizing film 2a and the external protection film 2b, a second protective film 2c. The films 2b and 2c may be identical, and they may sandwich the polarizing film 2a so as to protect the latter on both its faces. The protective film 2c is therefore located between the polarizing film 2a and the adhesive layer 3.

A first method of manufacturing a polarizing optical element according to the invention will now be described. For this description, a polarizing structure 2 comprising a polarizing film 2a sandwiched between two protective films 2b and 2c, as shown in FIG. 1c, will be taken as an example. Such a structure may be purchased on a roll, and then cut to dimensions greater than those of the optical element to which it is intended to be bonded.

In a first variant of this method, the adhesive structure that includes a pressure-sensitive adhesive layer 3 is firstly deposited on the convex face of the lens 1, and then the polarizing structure 2 is pressed against the pressure-sensitive adhesive layer 3 so as to obtain a definitive assembly. This method is also applicable when the pressure-sensitive adhesive is an adhesive structure as described above. Advantageously, the adhesive layer 3 is initially in the form of a continuous film sandwiched between two peelable liners or liners. The layer 3 may then be transferred to the convex face of the lens 1 by carrying out the following steps:

/a1/ peeling off one of the two peelable liners so as to expose one face of the layer 3;

/b1/ pressing the exposed face of the layer 3 onto the front face of the lens 1, through the other of the two peelable liners of the layer 3; and /c1/ peeling off the other of the two peelable liners so as to expose the other face of the layer 3.

The use of such an adhesive is particularly advantageous from a practical standpoint. Thus, during step /b1/, the layer 3 is completely protected from any mechanical, physical or chemical impairment thanks to the permanent presence throughout this phase of the second peelable liner on the opposite face of the layer 3 from that in contact with the lens 1.

Between steps /a1/ and /b1/, the remaining peelable liner, which bears the adhesive layer 3, may be heated so as to soften it. Step /b1/ may then be carried out more easily, given that the remaining peelable liner and the layer 3 may deform so as to adapt to the shape of the convex face of the lens 1.

The layer 3 is then borne by the lens 1, on its convex face, and has an exposed face onto which the polarizing structure 2 is then pressed during a subsequent step /d1/ described later. After step /b1/, the lens 1 thus provided with the layer 3 may be transported or stored, given that the pressure-sensitive adhesive has a permanent tack capability.

According to a second variant of the method of manufacturing the polarizing optical element, the adhesive layer 3 is firstly pressed onto the polarizing structure 2 and then onto the lens 1 on the opposite side of the layer 3 from the polarizing structure 2, through the latter. This method is also applicable when the pressure-sensitive adhesive is an adhesive structure as described above. The layer 3 may still be initially sandwiched between two peelable liners. It is then transferred to the polarizing structure 2 in a similar way to that which has just been described in the case of transfer to the lens 1. However, such a transfer is simpler to implement on the polarizing structure 2, given that said structure 2 is in the form of a flexible film. Such a transfer comprises the following steps:

/a2/ peeling off one of the two peelable liners so as to expose a first face of the adhesive layer 3;

/b2/ pressing this first exposed face of the layer 3 onto the polarizing structure 2, through the other of the two liners of the layer 3; and /c2/ peeling off the other of the two peelable liners so as to expose a second face of the layer 3.

During a subsequent step (d2), the exposed second face of the pressure-sensitive layer 3 will be pressed against the surface of the lens 1 through the polarizing structure 2.

These two variants of the transfer method relate to the case in which the adhesive layered structure comprises the pressure-sensitive adhesive layer or layers in the form of film. It will be readily understood that the subject of the invention may also be realized by depositing the pressure-sensitive adhesive in liquid form, if the latter is packaged in this way, and to do so either on one face of the optical element or on one face of the polarizing structure, or on one face of the optical element and on one face of the polarizing structure. In this case, the pressure-sensitive adhesive may be deposited by techniques well known to those skilled in the art, such as spin coating, spray coating or by the use of a curtain coating machine for example.

In each of the variants of the method of applying the adhesive layered structure, the contacting surfaces may be pretreated so as to improve the adhesion. A chemical, physical or physico-chemical surface treatment may be applied to certain of the contacting surfaces. A corona discharge treatment for example may be applied to the surface of the lens 1 and/or to that face of the polarizing structure 2 which is applied to the adhesive structure 3. Any other surface treatment making it possible for example to increase the surface energy and/or the polarity of the treated surfaces may be used, such as for example corona discharge, plasma, acid or base treatment, UV irradiation.

In each of the two variants of the method, the polarizing structure 2 may be preformed before being pressed against the surface of the lens 1. Optionally, the polarizing structure 2 is preformed with a mean radius of curvature that is larger than the mean radius of curvature of the surface of the lens 1. Such preforming gives the polarizing structure 2 a shape intermediate between its flat initial shape and its final shape imposed by the convex surface of the lens 1. It will therefore be easier to apply the structure 2 against the lens 1 and no pleating, stretching or tearing in the structure will occur.

The performing of the polarizing structure 2 may be carried out in various ways. In particular, this may comprise a thermoforming operation during which the polarizing structure 2 is deformed after having been heated. It should be pointed out that the temperature of the thermoforming is limited so as not to degrade the polarizing film 2a that is included within said structure 2. As an example in the case of a PET polarizing film or a PVA-based polarizing film laminated between two TAC protective films, the performing temperature may be between about 80° C. and 190° C. and this temperature is imposed for a time of between a few seconds and 1 minute. A thermoforming device such as that described in United States patent application published under the number US 2005/0121835 may for example be used. It is possible to use any other thermoforming method known to those skilled in the art that allows the functional integrity of the film to be preserved. If the adhesive structure 3 is firstly pressed onto the polarizing structure 2, the polarizing structure 2 is preformed with the adhesive structure 3 before the adhesive structure 3 is pressed against the lens 1 via the polarizing structure 2. If the adhesive structure 3 is firstly pressed onto the lens 1, the polarizing structure 2 may be preformed against a mold having a profile similar to the convex face of the lens 1, before the adhesive structure 3 is transferred to the lens 1.

Figure 2:
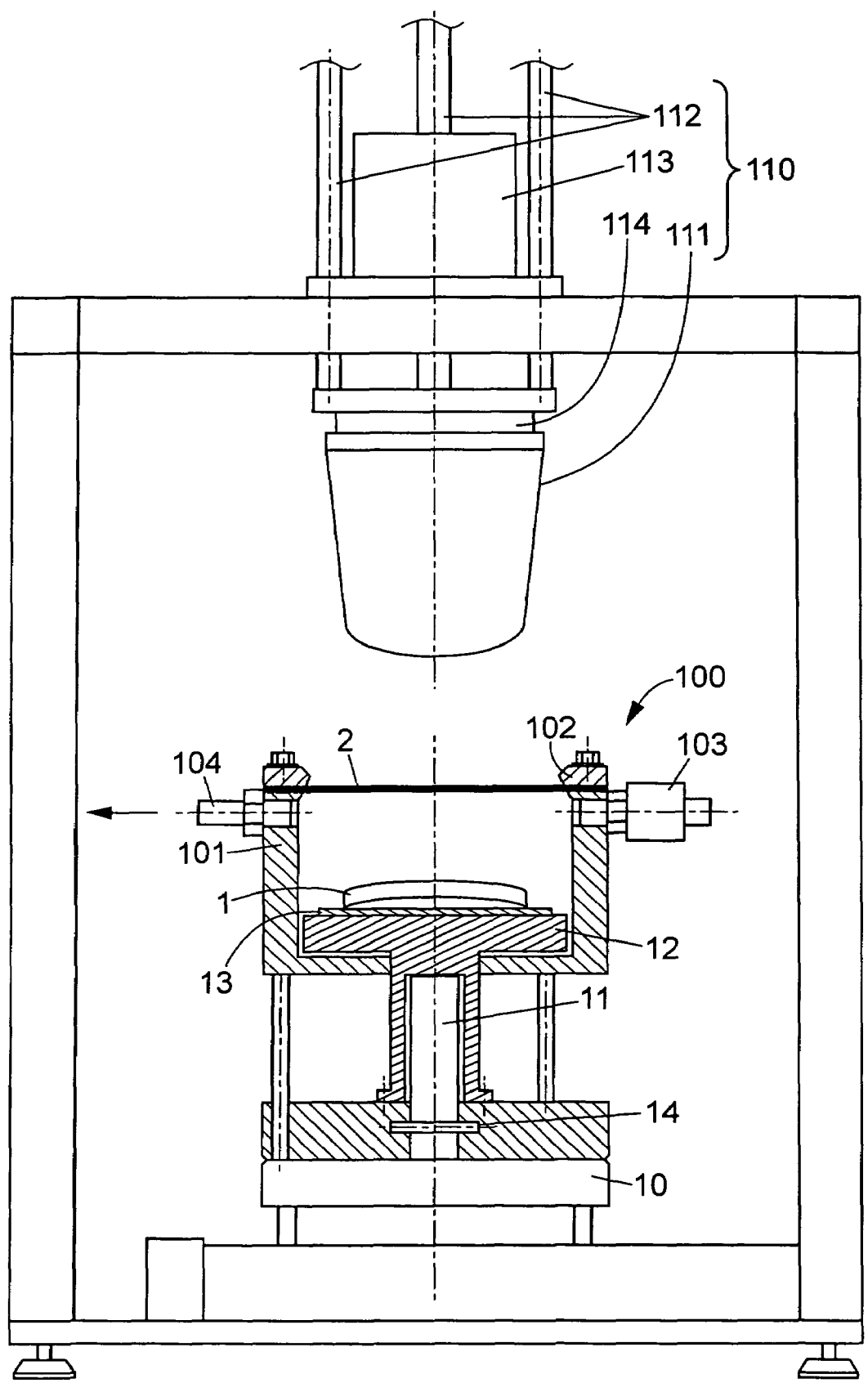
FIG. 2 illustrates a first pressing device that can be used in a method for manufacturing a polarizing optical element according to the invention.

The polarizing structure 2 is then pressed against the convex surface of the lens 1, during a step /d1/ or /d2/, depending on whether the adhesive structure 3 is already supported by the lens 1 or by the polarizing structure 2. This step /d1/ or /d2/ may be carried out for example using a device such as that described in French patent application FR05/03306 and illustrated in FIG. 2. Such a device comprises a low-pressure chamber 100 and an application system 110 that is supported above the chamber 100 by means of a rigid structure.

The low-pressure chamber 100 itself has a side wall 101 which is for example cylindrical with a vertical axis. It is provided with a clamping ring 102, in order to keep a membrane fixed against the upper peripheral edge of the wall 101. The chamber 100 is thus closed off in a sealed manner on its upper face. The chamber 100 is placed above a base 10 at a fixed height. A cylinder 11 of vertical axis and a piston 12, which passes through the lower face of the chamber 100, allow an element holder 13 to be moved vertically inside the chamber 100. A locking system 14 makes it possible to fix the height of the element holder 13, and the wall 101 is provided with a gas inlet orifice 103 and with an outlet orifice 104. The orifice 104 is connected to a pumping unit (not shown).

The application system 110 includes a pad 111 mounted on vertical slideways 112 and can be moved by means of a displacement system 113. Such a displacement system may comprise a stepper motor that drives for example a translation screw. A pressure detector 114, which may comprise a piezoelectric element, makes it possible to measure the force with which the pad 111 is applied against the sealing membrane of the chamber 100.

The polarizing structure 2 is fastened to the chamber 100 by means of the ring 102. It is oriented so that the adhesive structure 3 is turned toward the inside of the chamber 100 if said structure 3 has been transferred beforehand to the polarizing structure 2.

The lens 1 is fastened to the element holder 13, so that its convex surface is facing upward. This surface bears the layered structure that includes at least one pressure-sensitive adhesive layer 3, if the latter has been transferred beforehand to the lens 1.

The polarizing structure 2 can then be applied against the lens 1 by bringing the structure 2 and the lens 1 together in several steps.

The pad 111 is lowered so as to push down on a central portion of the polarizing structure 2 toward the inside of the chamber 100. Given that the structure 2 is held firmly around its periphery by the ring 102, the structure 2 is deformed and assumes a curved shape, corresponding to that of the lower end of the pad 111. The curvature imposed in this way on the structure 2 guarantees a point contact with the lens 1 when, during a second step, the lens 1 is moved up so as to come into contact with the polarizing structure 2. This movement of the lens 1 so as to come into contact with the polarizing structure 2 is obtained by creating a vacuum inside the chamber 100. The piston 12 may thus rise progressively as a gas initially present in the chamber 100 is extracted via the orifice 104. When a point contact is achieved between the polarizing layered structure 2 and the convex surface of the lens 1, via the adhesive structure 3, the height of the piston 12 is then fixed by means of a locking system 14.

Finally, during a third step, the pad 111 is lowered again, by pressing it against the polarizing structure 2, on the opposite side of the latter from the lens 1. The applied force is controlled by means of the detector 114. This may be chosen so that the pressure exerted on the structure 2 is for example a few kilograms per square centimeter. In this way, the structure 2 is applied against the entire convex face of the lens 1, with the adhesive structure 3 sandwiched between them. The end of the pad 111 is preferably made of a flexible material so as to obtain uniform application of the structure 2 over the entire face of the lens 1.

The pad 111 is then raised, the suction inside the chamber 100 is stopped, and the ring 102 is unlocked. The lens 1 is removed from the device with the structure 2 bonded via the structure 3 on its convex face, perfectly matching the geometry of the optical base element, including in the case of a progressive ophthalmic lens. The lens 1 thus provided with the polarizing film 2a possesses a polarizing function and a satisfactory optical quality, compatible with ophthalmic use of the lens. The inventors have found that the application of the structure 2 to the lens 1 does not disturb the orientation of the dichroic dyes within the film 2a. After the bonding operation, the lens 1 therefore has a high polarization effectiveness, substantially equal to that of the polarizing film 2a in its initial state.

Furthermore, the use of a vacuum inside the chamber 100 during application of the structure 2 to the lens 1 helps to avoid any gas bubbles being unintentionally trapped between the structure 2 and the lens 1 via the structure 3.

It should be noted that a preliminary step of heating the polarizing structure 2 may be carried out before the pad 111 is lowered and the lens 1 brought up to the structure 2, so as to allow, if necessary, the polarizing structure 2 to be thermoformed.

FIGS. 3*a*-3*c* illustrate another device that can be used for applying the polarizing structure 2 to the lens 1. According to FIG. 3*a*, a pressing system consisting of two inflatable membranes comprises first and second devices, with the references 200 and 300 respectively. FIG. 3*b* shows these two devices in a displaced configuration.

The two devices 200 and 300 may be joined together with a predetermined gap 400 (FIG. 2*c*) between them by means of two lateral flanges 301 and 302. The flanges 301 and 302 may be integral with the device 300 and provided with grooves 303 and 304. The device 200 is then provided with lateral rails 203 and 204, in order to allow the devices 200 and 300 to be simply joined together by the rails 203 and 204 moving along the grooves 303 and 304, which form slideways.

In the embodiment of the invention described now, each device 200 (or 300) comprises a main body 210 (or 310) provided with an opening 211 (or 311). The opening is slightly larger than the size of the lens 1. A closure part 212 (or 312) may be joined to the main body 210 (or 310), by pinching an elastic membrane 213 (or 313) between the part 212 (or 312) and the body 210 (or 310) around the opening of the latter. Furthermore, each closure part 212, 312 is provided with gas inlet means, for introducing a pressurized gas between this closure part and the corresponding membrane. These inlet means comprise an internal duct part 214 (or 314) machined in the closure part 212 (or 312), an external duct part 215 (or 315) and a system 216 (or 316) for connection to a pressurized gas source (not shown). A recess 217 (or 317) is made in the main body 210 (or 310) for passage of the external duct part 215 (or 315). Each main body 210 (or 310) has a straight bore 218 (or 318) around the opening 211 (or 311), this being suitable for keeping the closure part 212 (or 312) in a centered position with respect to the opening. It also includes a conical surface part 219*a* (or 319*a*) for guiding the deformation of the membrane 213 (or 313) via the opening. A curve connecting surface 219*b* (or 319*b*) connects the bore 218 (or 318) to the conical surface part 219*a* (or 319*a*). Finally, for each device 200 (or 300), the closure part 212 (or 312) is held clamped against the main body 210 (or 310), while pinching the membrane 213 (or 313) in a sealed manner, by screwed brackets 220 (or 320).

Figure 4A:
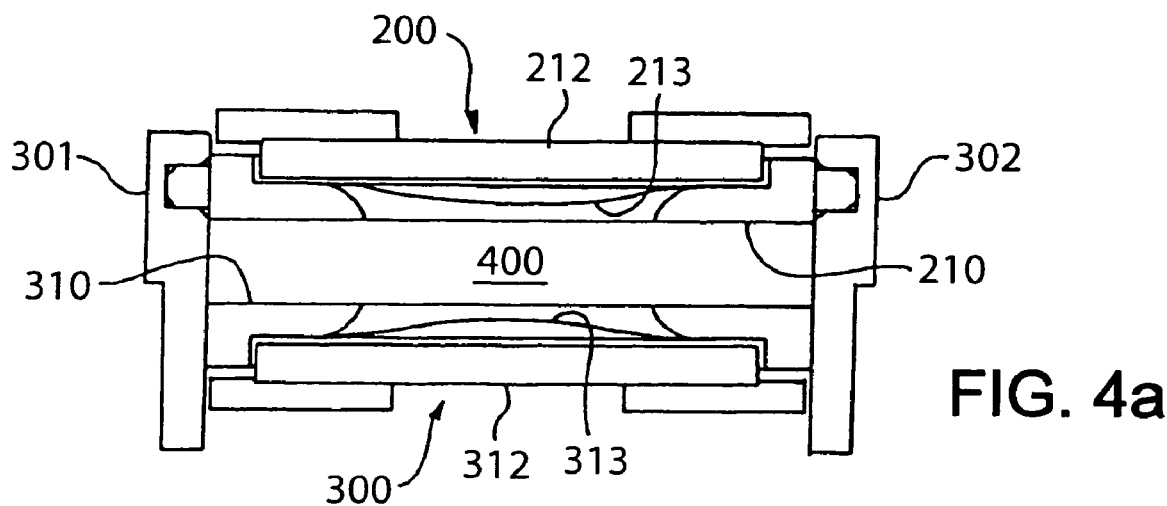
FIGS. 4a-4f illustrate various steps of a method for manufacturing a polarizing optical element according to the invention, using the pressing device of FIGS. 3a-3c.

FIGS. 3*c* and 4*a* show the two devices 200 and 300 in the assembly position, when the membranes 213 and 313 are each partially inflated by a gas pressure.

To use this second variant of the method, it is necessary to preform the polarizing structure 2 so as to give it a shape, preferably a spherical shape, whose radius of curvature is close to the main radius of curvature of the lens 1. This performing step may employ a thermoforming method and device, as described in patent application US 2005/0121835, this being well suited for the case of a layered structure based on PVA and protective films based on cellulose triacetate.

Prior to the thermoforming step, the polarizing structure 2 is heated so as to soften it. This step may for example be carried out by means of infrared ceramic whose setpoint temperature is between 80° C. and 200° C., preferably between 130° C. and 195° C., so that the temperature of the polarizing structure 2 is close to the glass transition temperature of a main constituent of the layered of the structure. This heating is maintained for a time of between 5 seconds and 30 minutes, preferably between 20 seconds and 1 minute.

The thermoforming step for a polarizing structure 2 as described above is especially carried out by applying a controlled pressure to said structure held in place in the thermoforming station and by applying a stream of hot gas uniformly distributed over the entire device. The stream of gas heated to a temperature between 20° C. and 165° C., preferably between 90° C. and 130° C., allows a pressure of between 20 and 290 psi, preferably between 60 and 120 psi, to be applied to the polarizing structure 2 for a time of between 5 seconds and 15 minutes, preferably between 20 and 60 seconds. Such operating conditions cause the polarizing structure 2 to deform and match the shape of the insert present in the lower portion of the device. The polarizing structure 2 thus preformed may be cut so as to separate it from its periphery that has remained plane.

The step of pressing the polarizing structure 2 thus preformed against the lens 1, compressing the adhesive structure 3, will now be described with reference to FIGS. 4*b*-4*f*.

The device 200 is firstly withdrawn and the layered structure 2 placed on the membrane 313 of the device 300. If the polarizing structure 2 bears the adhesive structure 3, the structure 2 is oriented so that the structure 3 faces upward (the variant of the method corresponding to FIGS. 4*b*-4*f*).

Figure 4B:
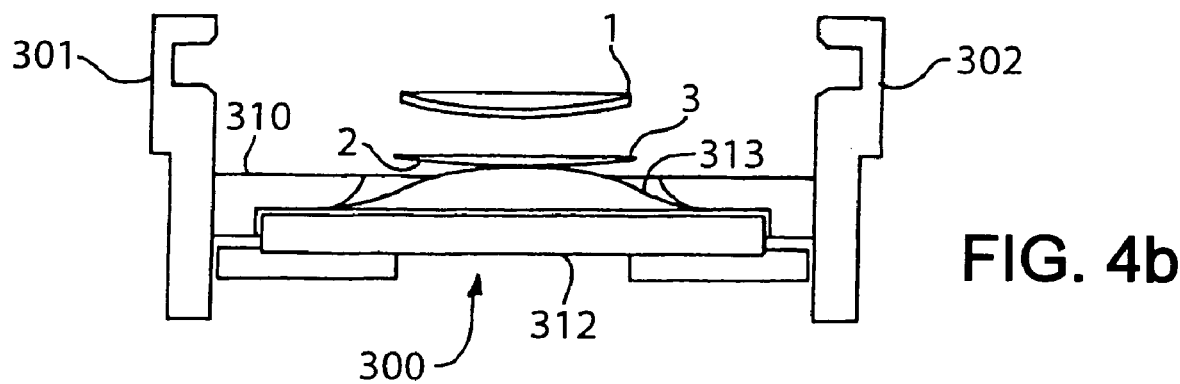
Figure 4C:
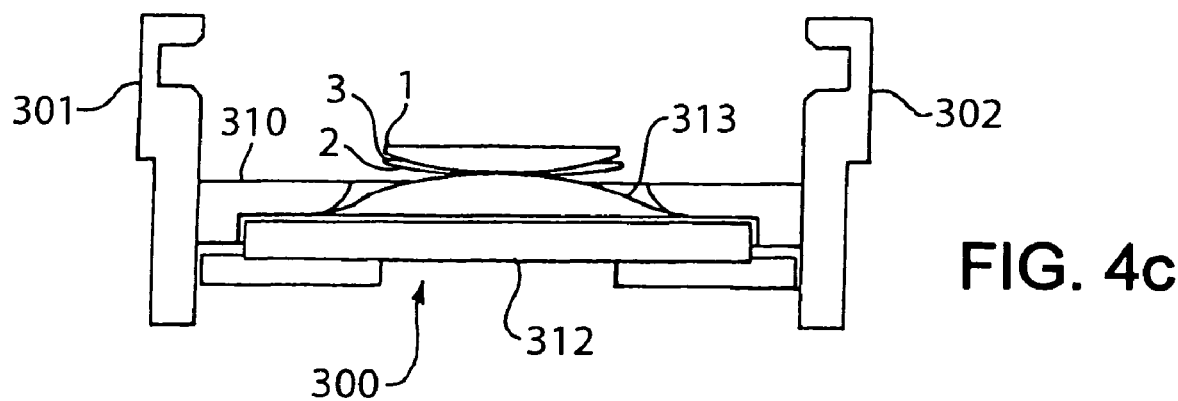

The lens 1 is placed in turn on the polarizing structure 2, with its convex face facing downward. If the lens 1 bears the adhesive structure 3 on its convex face, the structure 3 then faces downward, facing the structure 2 (FIGS. 4*b* and 4*c*). When the structure 2 has been preformed beforehand, the structure 2 and the lens 1 may have substantially complementary contacting surfaces.

Figure 4D:
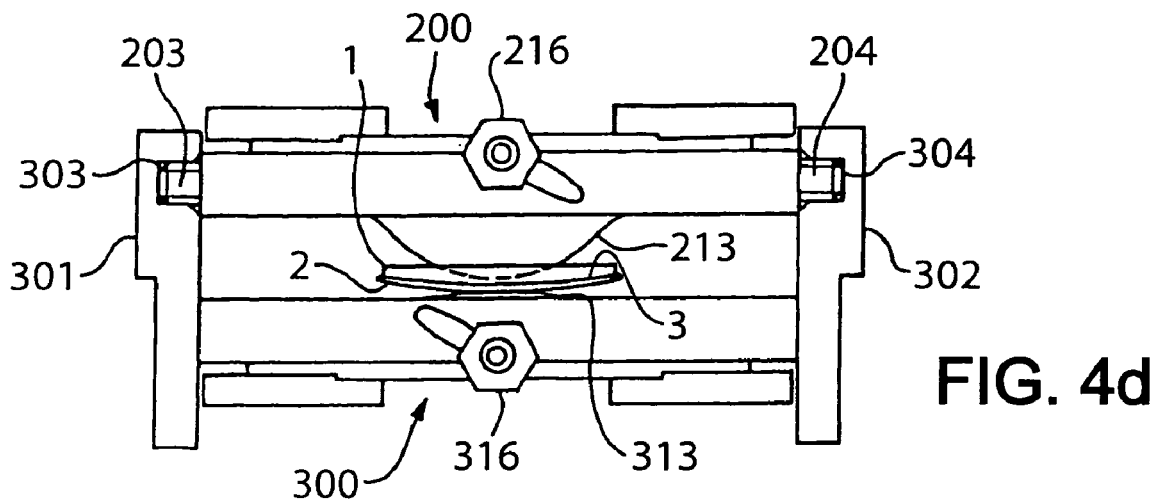
Figure 4E:
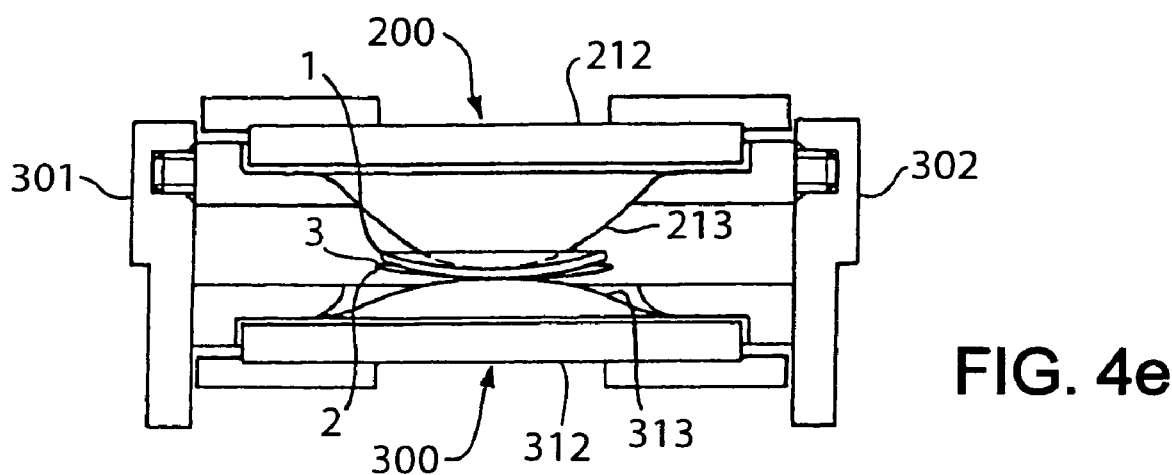

The device 200 is then joined to the device 300, by engaging the rails 203 and 204 in the grooves 303 and 304 of the flanges 301 and 302. The two membranes 213 and 313 are brought in this way so as to face each other on either side of the lens 1 and of the structure 2. Next, a gas is introduced under pressure into the cavity lying between the closure part 212 and the membrane 213 of the device 200 until the membrane 213, by inflating, touches the rear face of the lens 1. FIG. 4*d* illustrates such a configuration, while FIG. 4*e* is a sectional view corresponding to FIG. 4*d* and clearly showing the inflated membrane 213.

Figure 4F:
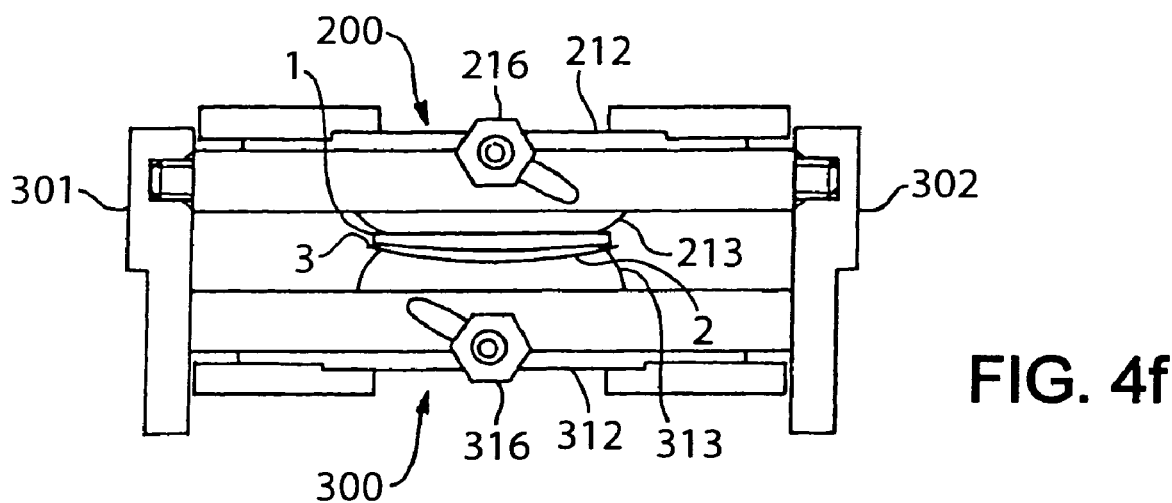

Finally, the gas pressure between the part 312 and the membrane 313 in the device 300 is made equal to the pressure between the part 212 and the membrane 213 in the device 200, this latter pressure being kept substantially constant. Such a method of operation prevents any displacement of the lens 1 and the polarizing structure 2 from occurring. The membrane 313 is thus inflated against the polarizing structure 2, and the membrane 213 serves as bearing surface for the lens 1. The pressure in the membrane 313 is increased until the latter is deformed so as to be applied against the entire surface of the polarizing structure 2 (FIG. 4*f*). In this way, the pressure of the membrane 313 is transmitted to the adhesive layer 3 at each point on the surface of the lens 1. The structure 2 is thus applied uniformly against the lens 1.

The gas pressure inside the devices 200 and 300 is then reduced and the lens 1 recovered. The polarizing structure 2 is then bonded to the convex face of the lens 1 via the adhesive structure 3. The inventors have found that such a method does not cause any reduction in the polarization contrast of the film 2*a* relative to the initial value of this contrast measured before the structure 2 was joined to the lens 1. The polarizing lens obtained also exhibits good optical quality.

Figure 5:
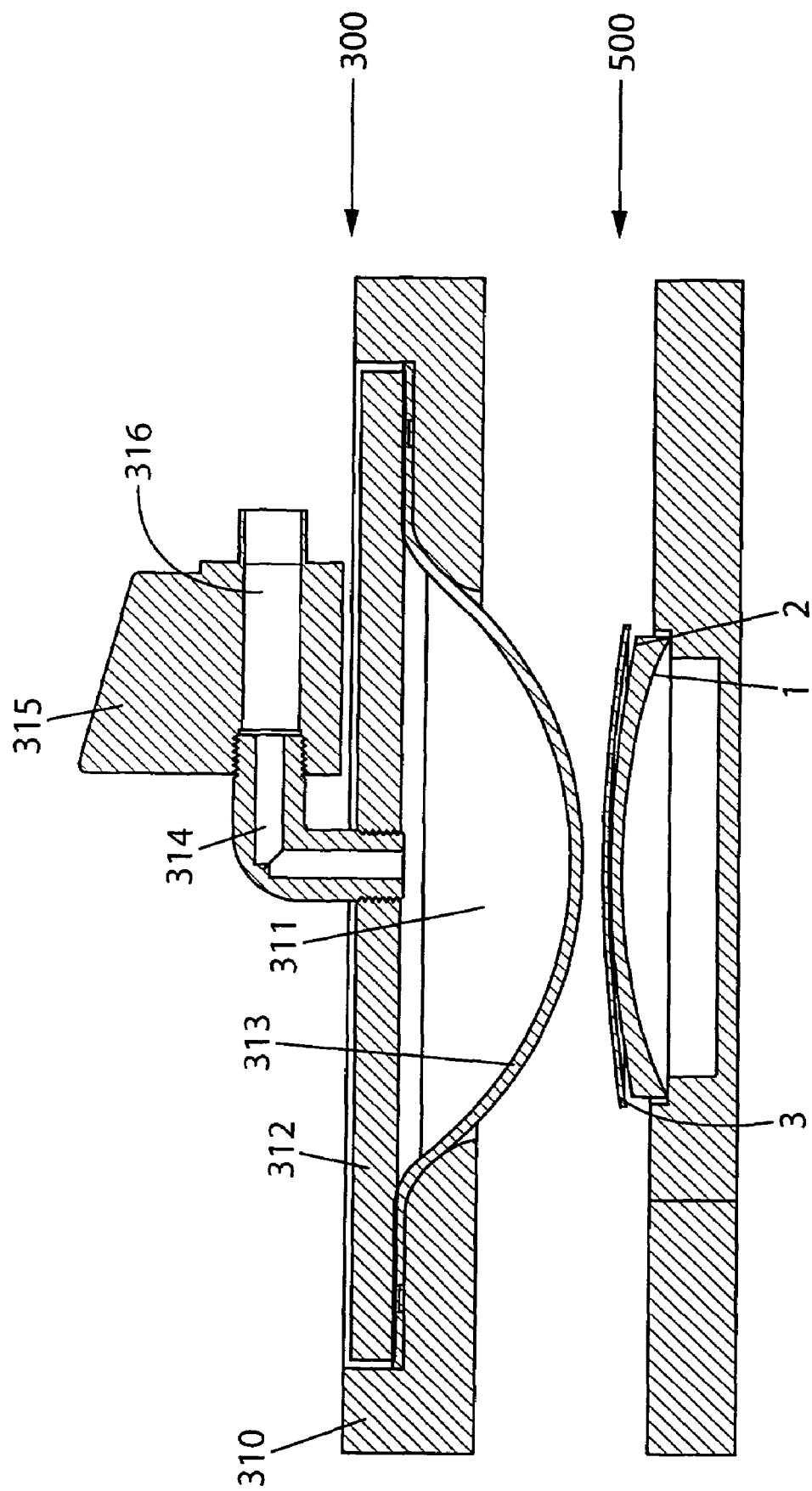
FIG. 5 illustrates a variant of the pressing device shown in FIGS. 3a-3c, this variant being able to be used in a method for manufacturing a polarizing optical element according to the invention.

Optionally, in another variant of the method, shown in FIG. 5, a single membrane may be used. In this case the device 300 having the membrane 313 is present and the device 200 with the membrane 213 is replaced with a rigid plate 500 that engages in the grooves 303 and 304 of FIG. 3b, these not being shown in FIG. 5. The lens 1 is held in place on the concave side by the rigid plate 500 that replaces the device 200 or by any other element having a shape and rigidity allowing it to fulfill the function of supporting the lens 1. The sequence of the method for applying the polarizing structure 2 to the lens 1 via the adhesive structure 3 may therefore be reduced to pressurizing the membrane 313 fastened to the device 300.

Of course, many modifications may be introduced into the embodiments of the invention that have just been described in detail. In particular, the following modifications are possible, while still maintaining at least some of the advantages of the invention:

the polarizing film may be moistened in a controlled manner before the layered structure is pressed against the optical base element, especially when the layered structure is formed by just a PVA-based polarizing film, that is to say with no protective film. Such moistening allows the polarizing film to conform more easily to the curvature of the surface of the optical base element;

the adhesive structure 3 may include two "pressure-sensitive" adhesive layers of optical quality of the same or different type, which are separated by an insert film, for example a PET film 10 μm in thickness. After the complex adhesive structure 3 has been assembled on the lens 1, one of the adhesive layers is placed between the optical base element and the insert film, and the other layer of the adhesive is placed between the insert film and the polarizing structure. Such a configuration based on two separate pressure-sensitive adhesives allows the choice of these adhesives to be optimized independently of each other, so as to obtain excellent adhesion to the polarizing structure on the one hand, and to the optical base element on the other, and moreover on both sides of the insert film;

the polarizing optical element obtained may be heated after the polarizing structure has been pressed against the optical base element, so as to reduce any strain present in the layered structure. Such heating may be carried out for example in an oven at 80° C. for 1 hour; and when the polarizing structure bonded to the optical base element is formed by just the polarizing film, a functional coating may be applied subsequently to the polarizing film, so as to protect the latter. Such a coating may in particular be an impact-resistant or antiabrasion coating, such as those commonly used, in particular in the optical and ophthalmic fields.

EXAMPLES

Example 1

Production of a Polarizing Ophthalmic Lens of 1.665 Index and 6.75 Diopter Base

The base of a lens or of a curved film is defined as being the refractive power of a plano-convex lens having a refractive index of 1.53 and having the same curvature.

The polarizing layered structure 2 is an SHC-128UP polarizing film, of the cellulose triacetate/PVA/cellulose triacetate type, produced by Polatechno and having a total thickness of 213 microns.

This initially plane film is thermoformed and then cut into a circle in such a way that it forms part of a sphere having a curvature corresponding to 6.00 diopter base. The convex face of the film thus preformed is treated by a corona discharge.

A polythiourethane-based ophthalmic lens, of 1.665 refractive index and of 6.75 diopter base, undergoes a corona discharge treatment on its convex face.

The lens is then placed in the vacuum module of a device well known to those skilled in the art, normally used for applying protective film prior to the steps of locking and surfacing semifinished lenses.

A CS9621 pressure-sensitive adhesive layered structure 3 sold by Nitto Denko is made up of a polyacrylate-based adhesive layer 25 microns thick and two protective polyethylene terephthalate (PET) films present on either side of the adhesive film. One of the two PET films is removed and then the adhesive layered structure is applied to the vacuum module so that the PSA layer is facing the convex face of the lens. The PSA/PET layered structure is then heated using a stream of hot air, so that the PET film supporting the PSA layer is very appreciably softened. The vacuum module is then turned on and the highly deformed PSA/PET film encounters the convex face of the lens, which rises in the module. The PSA/PET film is thus applied over the entire convex face of the lens.

The lens thus coated with the PSA/PET layered structure can be stored and then transported, or else immediately transported to the single membrane device 500 shown in FIG. 5.

The PET film protecting the PSA is removed and the lens placed in the device 500. The preformed polarizing layered structure 2 is then placed on top of the lens in such a way that the concave face of said structure 2 is facing the convex face of the lens 1 and in such a way that the geometric centers of each of the opposed faces are superposed.

The membrane 313 of the device 500 is then pressurized using compressed air (via the parts 314, 315 and 316 of the device). The membrane 313 is thus deformed and progressively presses the polarizing layered structure 3 against the PSA film present on the surface of the lens. A pressure of 35 psi is maintained in the membrane 313 for 10 seconds. Finally, the membrane is deflated and a polarizing lens thus obtained.

The lens thus obtained then undergoes the conventional surfacing step, if it is a semifinished lens, followed by the conventional trimming step.

Example 2

Production of a Polarizing Ophthalmic Lens with a 1.67 Index of and a 4.0 Base

The polarizing layered structure 2 is a polarizing film of the cellulose triacetate/PVA/cellulose triacetate type produced by Nitto Denko, under the reference TEG1465DU, which includes a polyacrylate PSA layer about 20 microns in thickness. Since the polarizing layered structure 2 has a thickness of about 110 microns, the total thickness of the commercial film is about 130 microns. Two additional, flexible and removable, protective films are placed respectively on one side of the polarizing film and on the other.

This film is initially plane. After peeling off the removable protective film located on the side with the PSA layer 3, the film is fastened to a device similar to that shown in FIG. 2, comprising a low-pressure chamber 100 and an application system 110. More precisely, the film is fastened to a chamber 100 by means of a ring 102 in such a way that the PSA layer 3 is facing the convex face of the lens 1 placed beforehand inside the chamber 100. The lens 1 is made of a thermosetting polymer with an index of about 1.67 for wavelengths in the visible spectrum, has a diameter of 65 mm and has a spherical convex face whose radius of curvature is 133 mm, which corresponds approximately to a 4.0 base surface.

The polarizing film is heated by means of a hot-air gun until reaching a mean temperature of 90 degrees Celsius. A silicone pad 111 having a Shore 00 hardness of 54 is lowered onto the film until it exerts a mechanical force of about 10 newtons thereon. That face of the pad in contact with the film has a radius of curvature at the center of about 43 mm. The lens is then brought into contact with the adhesive layer 3 supported by the film by creating a vacuum in the chamber 100, the vacuum being measured at 500 mbar. The movement of the lens brings the polarizing layered structure 2 so as to progressively match the profile of the convex face of the lens. At the same time, the PSA layer is thus progressively brought into contact with the convex face of the lens. Immediately after creation of the vacuum in the chamber 100, the pad 111 goes down again in order to exert, on the film presently in contact with the lens 1, a mechanical force of about 450 newtons, making it possible to complete the shaping of the film on the lens and to cause the adhesive PSA layer 3 to adhere. The force is maintained for 5 seconds. There then only remains for the protective film still present on the surface of the polarizing film to be peeled off.

The lens thus obtained then undergoes the conventional surfacing step, if it is a semifinished lens, followed by the conventional trimming step.

The invention claimed is:

1. A polarizing optical element comprising:
   an optical base element;
   a polarizing layered structure incorporating at least one polarizing film, said polarizing film containing at least one dichroic dye and being oriented,
   wherein the optical element further includes an adhesive layered structure that includes at least one layer of a pressure-sensitive adhesive of optical quality, placed between one surface of the optical base element and the polarizing structure so as to permanently retain said polarizing structure on the surface of the optical base element;
   wherein the optical base element comprises an ophthalmic lens.

2. The element as claimed in claim 1, wherein the polarizing film is based on polyvinyl alcohol or polyethylene terephthalate.

3. The element as claimed in claim 1, wherein the polarizing structure further includes at least one protective film for protecting the polarizing film.

4. The element as claimed in claim 3, wherein the protective film is based on cellulose triacetate, cellulose acetate butyrate, polyethylene terephthalate, polycarbonate or polyamide.

5. The element as claimed in claim 3, wherein the protective film is placed on the opposite side of the polarizing film from the optical base element.

6. The element as claimed in claim 5, which further includes at least one functional coating placed on the protective film on the opposite side of said protective film from the polarizing film.

7. The element as claimed in claim 3, wherein the polarizing structure includes two protective films placed on each side of the polarizing film.

8. The element as claimed in claim 7, wherein the two protective films are identical.

9. The element as claimed in claim 7, wherein the two protective films are different.

10. The element as claimed in claim 1, which further includes at least one functional coating placed directly on the polarizing film.

11. The element as claimed in claim 1, wherein the pressure-sensitive adhesive of the adhesive structure is chosen from a polyacrylate-based compound and a styrene-based block copolymer.

12. The element as claimed in claim 11, wherein the pressure-sensitive adhesive is a polyacrylate.

13. The element as claimed in claim 1, wherein the adhesive structure has a thickness of between 0.5 and 300 microns.

14. The element as claimed in claim 13, wherein the adhesive structure has a thickness of between 2 and 100 microns.

15. The element as claimed in claim 1, wherein the optical base element includes a portion made of a material based on at least one polycarbonate compound, on at least one polyamide compound, on diethylene glycol-bis(allyl carbonate) polymers or copolymers, on thiouyrethane polymers or copolymers or on episulfide polymers or copolymers.

16. The element as claimed in claim 1, wherein the adhesive structure comprises two adhesive layers of optical quality, made of a first and a second pressure-sensitive adhesive respectively, and an insert film, a first of said two adhesive layers being placed between the optical base element and the insert film, and a second of said two adhesive layers being placed between said insert film and the polarizing structure.

17. The element as claimed in claim 16, wherein the first pressure-sensitive adhesive and the second pressure-sensitive adhesive are different.

18. The element as claimed in claim 16, wherein the first pressure-sensitive adhesive and the second pressure-sensitive adhesive are identical.

19. The element as claimed in claim 1, wherein the polarizing structure is located on a front face of the ophthalmic lens.

20. The element as claimed in claim 1, wherein the polarizing film is a self-supporting sheet.

21. A method for manufacturing a polarizing optical element comprising the following steps:
    providing an optical base element;
    providing a polarizing layered structure incorporating at least one polarizing film, said polarizing film containing at least one dichroic dye and being oriented;
    providing an adhesive layered structure incorporating at least one layer of a pressure-sensitive adhesive of optical quality; and
    pressing the polarizing structure against the surface of the optical base element with the adhesive structure placed between said polarizing structure and said optical base element;
    herein the optical base element comprises an ophthalmic lens.

22. The method as claimed in claim 21, wherein the adhesive structure is first pressed onto the surface of the optical base element and then the polarizing structure is pressed onto the adhesive structure, on the opposite side of said adhesive structure from the optical base element.

23. The method as claimed in claim 22, wherein the adhesive structure is initially inserted between two peelable liners, and wherein said method comprises the following steps:
    /a1/ peeling off one of the two peelable liners so as to expose one face of an pressure-sensitive adhesive layer;
    /b1/ pressing the exposed face of pressure-sensitive adhesive layer onto the surface of the optical base element, through the other of the two peelable liners;
    /c1/ peeling off the other of the two liners so as to expose another face of pressure-sensitive adhesive layer; and /d1/ pressing the polarizing structure onto said another exposed face of pressure-sensitive adhesive layer.

24. The method as claimed in claim 23, which further includes, between steps /a1/ and /b1/, heating said other peelable liner bearing the adhesive structure so as to soften said other liner.

25. The method as claimed in claim 21, wherein the adhesive structure is first pressed onto the polarizing structure, and then against the optical base element on the opposite side of the adhesive structure from the polarizing structure, through said polarizing structure.

26. The method as claimed in claim 25, wherein the adhesive structure is initially inserted between two peelable liners, and wherein the method includes the following steps:
   /a2/ peeling off one of the two peelabele liners so as to expose one face of pressure-sensitive adhesive layer;
   /b2/ pressing the exposed face of pressure-sensitive adhesive layer onto the polarizing structure, through the other of the two peelable liners;
   /c2/ peeling off the other of the two liners so as to expose another face of pressure-sensitive adhesive layer; and
   /d2/ pressing said another exposed face of pressure-sensitive adhesive onto the surface of the base optical element, through the polarizing structure.

27. The method as claimed in claim 21, wherein the adhesive structure is deposited in liquid form by a spin coating or spray coating process or by the use of a curtain coating machine, either onto one face of the optical base element, or one face of the polarizing structure, or one face of the optical base element and one face of the polarizing structure.

28. The method as claimed in claim 21, wherein the polarizing structure is preformed before being pressed against the surface of the optical base element.

29. The method as claimed in claim 28, wherein the polarizing structure is preformed with a larger mean radius of curvature than the mean radius of curvature of the surface of the optical base element.

30. The method as claimed in claim 28, wherein the preforming of the polarizing structure comprises a thermoforming operation.

31. The method as claimed in claim 28, wherein the adhesive structure is first pressed onto the polarizing structure, and then against the optical base element on the opposite side of the adhesive structure from the polarizing structure, through said polarizing structure;
   and wherein the polarizing structure is preformed with the adhesive structure after said adhesive structure has been pressed onto said polarizing structure and before the adhesive structure is pressed against the optical base element through the polarizing structure.

32. The method as claimed in claim 21, wherein the polarizing film is moistened before the polarizing structure is pressed against the optical base element.

33. The method as claimed in claim 21, wherein the polarizing optical element is heated after the polarizing structure has been pressed against the optical base element, so as to reduce any strain present in the layered structure.

34. The method as claimed in claim 21, wherein the polarizing film is a self-supporting sheet.

* * * * *